(12) United States Patent
Cohen et al.

(10) Patent No.: US 11,854,009 B2
(45) Date of Patent: Dec. 26, 2023

(54) METHOD FOR POOLING IN A PROOF-OF-SPACE-BASED BLOCKCHAIN VIA SINGLETONS

(71) Applicant: Chia Network Inc.

(72) Inventors: Bram Cohen, San Francisco, CA (US); Matt Hauff, San Francisco, CA (US); Mariano Sorgente, San Francisco, CA (US); Matt Howard, San Francisco, CA (US); Adam Kelly, San Francisco, CA (US)

(73) Assignee: Chia Network Inc., San Francisco, CA (US)

( * ) Notice: Subject to any disclaimer, the term of this patent is extended or adjusted under 35 U.S.C. 154(b) by 0 days.

(21) Appl. No.: 17/959,966

(22) Filed: Oct. 4, 2022

(65) Prior Publication Data

US 2023/0115694 A1    Apr. 13, 2023

Related U.S. Application Data

(60) Provisional application No. 63/253,259, filed on Oct. 7, 2021.

(51) Int. Cl.
*H04L 29/06* (2006.01)
*G06Q 20/40* (2012.01)
(Continued)

(52) U.S. Cl.
CPC ....... *G06Q 20/401* (2013.01); *G06Q 20/3678* (2013.01); *G06Q 20/389* (2013.01);
(Continued)

(58) Field of Classification Search
CPC ........ H04L 9/0643; H04L 9/3236; H04L 9/50
See application file for complete search history.

(56) References Cited

U.S. PATENT DOCUMENTS 10,554,407 B1    2/2020    Greco et al.
11,165,582 B2    11/2021    Boneh et al.
(Continued)

OTHER PUBLICATIONS

U.S. Appl. No. 17/320,114, filed May 13, 2021, Bram Cohen, Entire Document.
(Continued)

*Primary Examiner* — Dao Q Ho
(74) *Attorney, Agent, or Firm* — Run8 Patent Group, LLC; Peter Miller; Brian T. Chew (57) ABSTRACT

A method for pooling and retrieving block rewards in a reward pool including an operator node and a set of member nodes in a distributed network extending a proof-of-space-based blockchain includes: submitting a transaction configured to generate a singleton in a set of singletons, the singleton including: an outer puzzle hash linking the singleton to a singleton puzzle hash; and an inner puzzle hash defining a pool address associated with the reward pool; generating a block including a proof-of-space and a block reward allocated to the singleton puzzle hash; detecting the block reward allocated to the singleton puzzle hash; identifying the singleton linked to the singleton puzzle hash; and submitting a transaction configured to: remove the singleton from the set of singletons; and transfer the block reward from the singleton puzzle hash to the pool address.

10 Claims, 4 Drawing Sheets

(51) Int. Cl.
   *G06Q 20/36* (2012.01)
   *G06Q 20/38* (2012.01)
   *H04L 9/00* (2022.01)
   *H04L 9/06* (2006.01)

(52) U.S. Cl.
   CPC .............. *H04L 9/00* (2013.01); *H04L 9/0637* (2013.01); *H04L 9/50* (2022.05)

(56) References Cited

U.S. PATENT DOCUMENTS

| | | |
|---|---|---|
| 2016/0253622 A1 | 9/2016 | Sriram et al. |
| 2016/0283920 A1 | 9/2016 | Fisher et al. |
| 2016/0292672 A1 | 10/2016 | Fay et al. |
| 2017/0005804 A1 | 1/2017 | Zinder |
| 2017/0337534 A1 | 11/2017 | Goeringer et al. |
| 2017/0364700 A1 | 12/2017 | Goldfarb et al. |
| 2019/0020629 A1 | 1/2019 | Baird, III et al. |
| 2019/0081793 A1 | 3/2019 | Martino et al. |
| 2019/0173667 A1 | 6/2019 | Wang et al. |
| 2019/0190720 A1 | 6/2019 | Falk |
| 2019/0273616 A1 | 9/2019 | Bres |
| 2019/0303622 A1 | 10/2019 | Versteeg et al. |
| 2019/0303960 A1 | 10/2019 | Walsh |
| 2019/0349185 A1 | 11/2019 | Kim et al. |
| 2019/0373521 A1 | 12/2019 | Crawford |
| 2020/0044824 A1* | 2/2020 | Xie ................. H04L 9/0637 |
| 2020/0059364 A1* | 2/2020 | Konda ............... H04L 9/3242 |
| 2020/0092102 A1 | 3/2020 | Wang |
| 2020/0195421 A1 | 6/2020 | Gagnon |
| 2020/0394648 A1* | 12/2020 | Blackshear ........ G06Q 20/3823 |
| 2021/0256013 A1* | 8/2021 | Yang ................. G06F 16/2379 |
| 2021/0271667 A1* | 9/2021 | Cohen ............... H04L 9/3247 |
| 2022/0216997 A1* | 7/2022 | Davies ............... H04L 9/3239 |
| 2023/0115694 A1* | 4/2023 | Cohen ............... G06Q 20/389 705/44 |

OTHER PUBLICATIONS

U.S. Appl. No. 17/497,699, filed Oct. 8, 2021, Bram Cohen, Entire Document.
Abasulah et al, "Beyond Hellman's Time-Memory Trade-Offs with Applications to Proofs of Space" (2017) https://eprint.iacr.org/2017/893.pdf.
Bernstein, D.J., "The ChaCha family of stream ciphers" (2008)https://cr.yp.to/chacha.html.
Boneh et al., "Verifiable Delay Functions," In Hovav Shacham and Alexandra Boldyreva, Editors, CRYPTO 2018, Part I, vol. 10991 of LNCS, pp. 757{ 788. Springer, Heidelberg, Aug. 2018 (32 ?ages).
Boneh et al., "A Survey of Two Verifiable Delay Functions," Cryptology ePrint Archive, Report 2018/712, J018. https://eprinl.iacr.org/2018/712 (13 pages).
Cohen et al., "The Chia Network Blockchain", (2019)https://www.chia.net/assets/ChiaGreenPaper.pdf.
Cohen et al., "Simple Proofs of Sequential Work." Simple proofs of sequential work. In Jesper Buus Nielsen and Vincent Rijmen, editors, EU-ROCRYPT 2018, Part II, vol. 10821 of LNCS, pp. 451{467. Springer, Heidelberg, Apr. / May 2018(60 pages).
Dziembowski et al., "Proofs of Space," In Rosario Gennaro and Matthew J_ B. Robshaw, editors, CRYPTO 2015, Part II, vol. 9216 of LNCS, pp. 585{605. Springer, Heidelberg, Aug. 2015 (21 pages).
Eyal et al, "Majority is not Enough: Bitcoin Mining is Vulnerable," In Nicolas Christin and Reihaneh Safavi-Naini, editors, FC 2014, vol. 8437 of LNCS, pp. 436{454. Springer, Heidelberg, Mar. 2014 (18 pages).
Garay et al., "The Bitcoin Backbone Protocol with Chains of Variable Difficulty," In Jonathan Katz and Hovav Shacham, editors, CRYPTO 2017, Part I, vol. 10401 of LNCS, pp. 291{323. Springer, Heidelberg, Aug. 2017 (30 pages).
Garay et al., "The Bitcoin Backbone Protocol: Analysis and Applications," In Elisabeth Oswald and Marc Fischlin, editors, EUROCRYPT 2015, Part II, vol. 9057 of LNCS, pp. 281{310. Springer, Heidelberg, Apr. 2015 (47 pages).
Kumar, Amil, "MIT: Crypto puzzle solved 15 years too early," Apr. 30, 2019 https://www.revyuh.com/lop-news/rending/mit-crypto-puzzle-solved-15-years-loo-early/ (3 pages).
Long et al., "Binary quadratic forms," 2018 https://github.com/Chia-Nelwork/vdf-competition/blob/master/classgroups.pdf(28 pages).
Notice of Allowance and Fees Due for U.S. Appl. No. 17/320,114 dated Jul. 25, 2022.
Notice of Allowance and Fees Due for U.S. Appl. No. 17/489,480 dated Dec. 1, 2022.
Notice of Allowance and Fees Due for U.S. Appl. No. 17/496,405 dated Dec. 7, 2022.
Notice of Allowance received in U.S. Appl. No. 15/931,463 dated Aug. 10, 2021.
Oeschlin, Philippe, "Making a Faster Cryptanalytic Time-Memory Trade-Of" (2003)https://lasec.epfl.ch/pub/lasec/doc/Oech03.pdf.
Park et al., "SpaceMint: A Cryptocurrency Based on Proofs of Space," Cryptology ePrint Archive, Report 2015/528, J015. http://eprinl.iacr.org/2015/528 (29 pages).
Pietrzak, Krzysztof, "Simple Verifiable Delay Functions," Cryptology ePrint Archive, Report 2018/627, 2018. hllps://eprinl.iacr.org/2018/627 (20 pages).
Simisker, Mart, "A review of "Asymmetric Numeral Systems"", (2017)https://courses.cs.ut.ee/MTAT.07.022/2017_fall/uploads/Main/mart-report-f17.pdf.
Wesolowski, Benjamin, "Efficient verifiable delay function," Cryptology ePrint Archive, Report 2018/623, 2018. https://eprinl.iacr.org/2018/623 (29 pages).
Chia Network, "Singletons and Ethereum-like Contracts in Chia | Chialisp", YouTube, Aug. 9, 2021, retrieved on [Jan. 27, 2023]. Retrieved from the internet entire video.
Chialisp, "Pooling", chialisp.com, Jul. 13, 2021, retrieved on [Jan. 27, 2023]. Retrieved from the internet entire document.
Eckert et al., "Pooling FAQ", GitHub, Aug. 9, 2021, retrieved on [Jan. 27, 2023]. Retrieved from the internet entire document.
International Search Report for International Patent Application No. PCT/US22/45747 dated Mar. 13, 2023; 13 pages.
Notification of the International Application Number and of the International Filing Date for International Patent Application No. PCT/US22/45747 dated Oct. 25, 2022; 1 page.

* cited by examiner

METHOD FOR POOLING IN A PROOF-OF-SPACE-BASED BLOCKCHAIN VIA SINGLETONS

CROSS-REFERENCE TO RELATED APPLICATIONS

This application claims the benefit of U.S. Provisional Application No. 63/253,259, filed on 7 Oct. 2021, which is incorporated in its entirety by this reference.

This application is related to U.S. Pat. No. 11,165,582, filed on 13 May 2020, U.S. patent application Ser. No. 17/320,114, filed on 13 May 2021, and U.S. patent application Ser. No. 17/497,699, filed on 8 Nov. 2021, each of which is incorporated in its entirety by this reference.

TECHNICAL FIELD

This invention relates generally to the field of blockchain protocols and more specifically to a new and useful method for pooling in a proof-of-space blockchain in the field of blockchain protocols.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
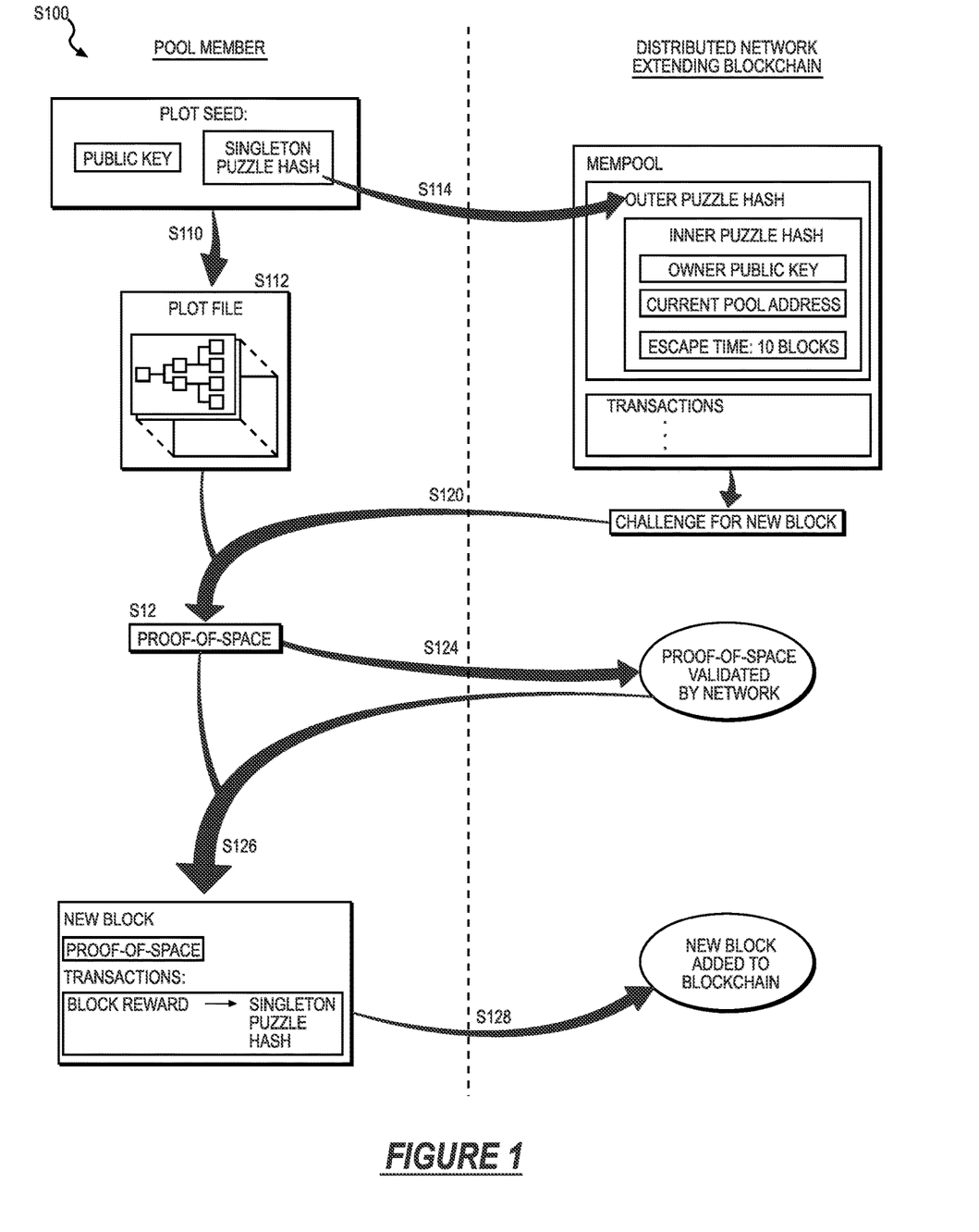
FIG. 1 is a flowchart representation of a method.

As shown in FIG. 1, a method S100 for pooling block rewards in a reward pool—including an operator node and a set of member nodes in a distributed network extending a proof-of-space-based blockchain—includes, during an initial time period, by a first member node in the set of member nodes: generating a plot file in Step S110, the plot file defining a set of proofs-of-space and a singleton puzzle hash; storing the plot file on a storage device in Step S112; and submitting a first transaction configured to generate a first singleton based on the singleton puzzle hash in Step S114, the first singleton including a) an outer puzzle hash linking the first singleton to the singleton puzzle hash and b) an inner puzzle hash defining a collection state of the first singleton representing an owner address associated with the first member node and a first pool address associated with the reward pool.

The method S100 further includes, during a first time period succeeding the initial time period, by the first member node: accessing a first challenge from a first version of the blockchain in Step S120; generating a first proof-of-space, from the set of proofs-of-space, responsive to the first challenge in Step S122; broadcasting the first proof-of-space over the distributed network in Step S124; generating a first block based on the first proof-of-space in Step S126, the first block including a block reward allocated to the singleton puzzle hash; and broadcasting the first block over the distributed network in Step S128.

1.1 Variation: Disbursing Block Rewards

Figure 2:
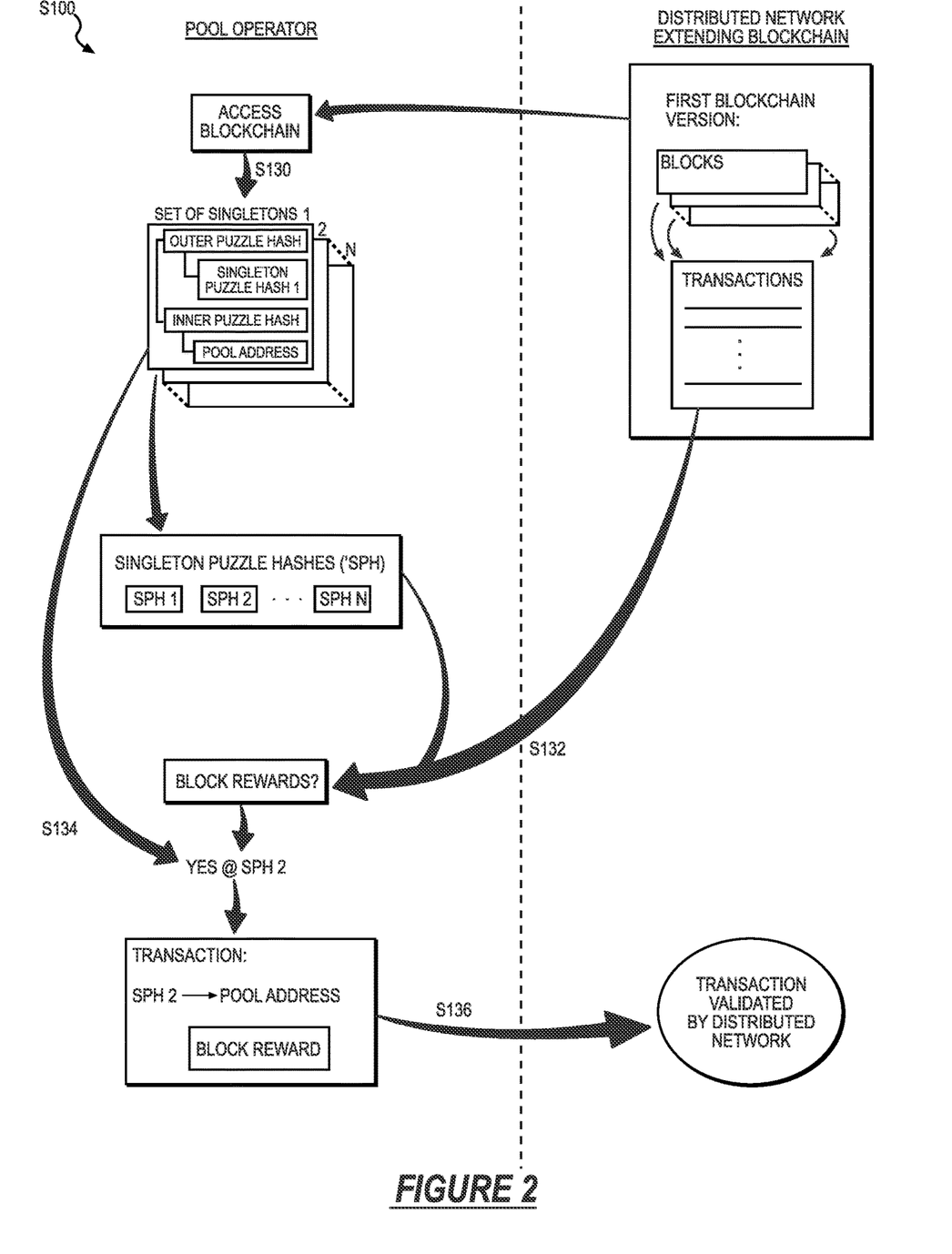
FIG. 2 is a flowchart representation of one variation of the method.

As shown in FIG. 2, one variation of the method S100 for retrieving and disbursing block rewards—in a reward pool including an operator node and a set of member nodes in a distributed network extending a proof-of-space-based blockchain—includes, during an initial time period, identifying a first set of singletons in a first version of the blockchain in Step S130, each singleton in the first set of singletons including: an outer puzzle hash linking a respective singleton in the first set of singletons to a respective singleton puzzle hash in a set of singleton puzzle hashes; and an inner puzzle hash defining a state of a respective singleton representing a) a respective owner address associated with a respective member node in the set of member nodes, and b) a first pool address associated with the reward pool.

This variation of the method S100 further includes, during a first time succeeding the initial time period: detecting a block reward allocated to a first singleton puzzle hash in the set of singleton puzzle hashes in Step S132; identifying a first singleton in the set of singletons linked to the first singleton puzzle hash in Step S134; and submitting a first transaction in Step S136, the first transaction configured to a) remove the first singleton from the set of singletons b) and transfer the block reward from the first singleton puzzle hash to the first pool address.

1.2 Variation: Pooling+Retrieving Block Rewards

Figure 4:
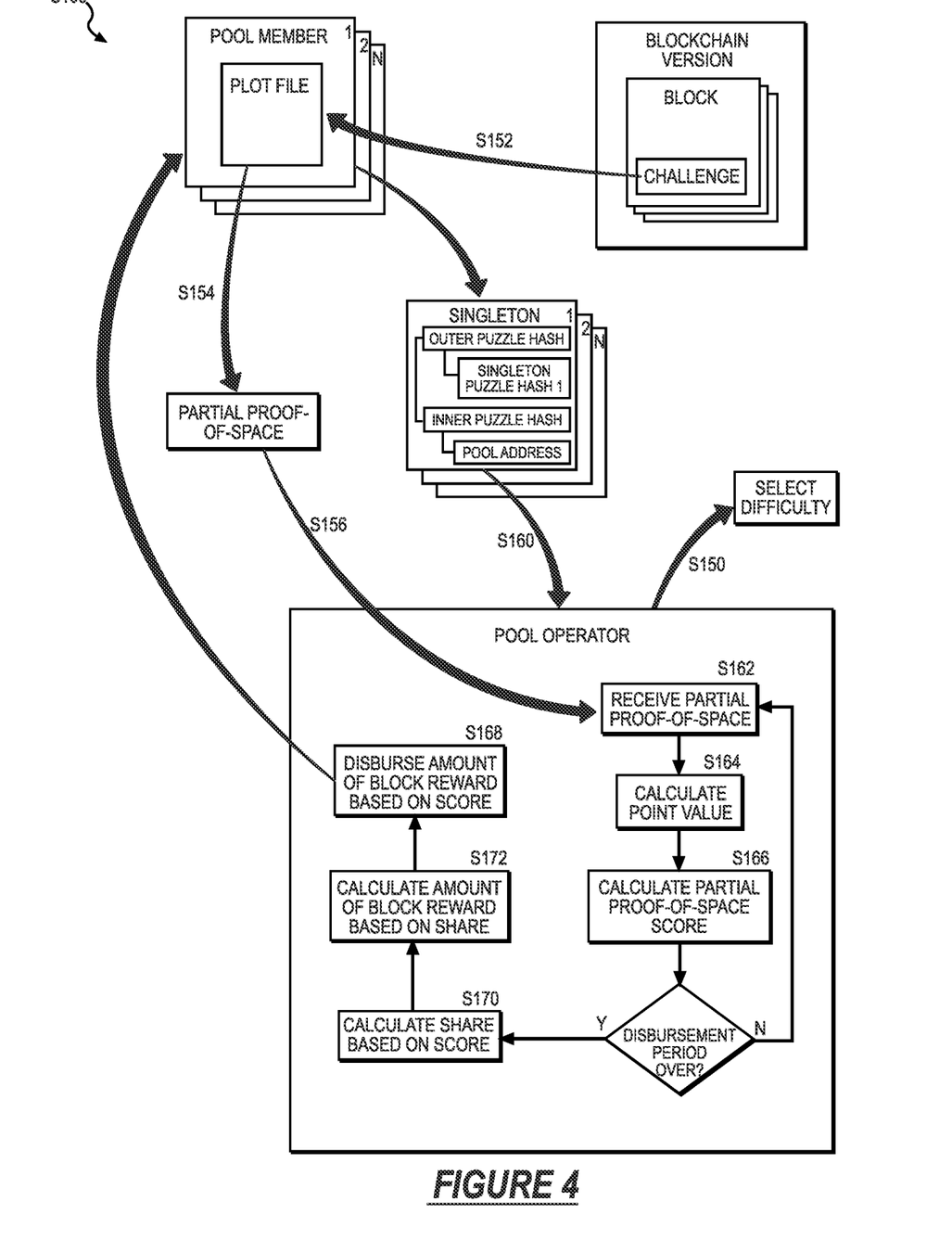
FIG. 4 is a flowchart representation of one variation of the method.

As shown in FIGS. 1, 2, and 4, another variation of the method S100 for pooling and retrieving block rewards in a reward pool—including an operator node and a set of member nodes in a distributed network extending a proof-of-space-based blockchain—includes, during an initial time period, by a first member node in the set of member nodes, submitting a first transaction configured to generate a first singleton in a set of singletons in Step S114, the first singleton including: an outer puzzle hash linking the first singleton to a singleton puzzle hash; and an inner puzzle hash defining a collection state of the first singleton representing a pool address associated with the reward pool.

This variation of the method S100 further includes, during a first time period succeeding the initial time period, by the first member node: accessing a first challenge from a first version of the blockchain in Step S120; generating a first proof-of-space, based on a plot file defining the singleton puzzle hash, responsive to the first challenge in Step S122; broadcasting the first proof-of-space over the distributed network in Step S124; generating a first block based on the first proof-of-space, the first block including a block reward allocated to the singleton puzzle hash in Step S126; and broadcasting the first block over the distributed network in Step S128.

This variation of the method S100 further includes, during a second time period succeeding the first time period, by the operator node: detecting the block reward allocated to the singleton puzzle hash in Step S132; identifying the first singleton linked to the first singleton puzzle hash in Step S134; and submitting a first transaction in Step S136, the first transaction configured to a) remove the first singleton from the set of singletons, and b) transfer the block reward from the singleton puzzle hash to the pool address.

2. Applications

Generally, Steps of the method S100 can be executed by a population of nodes (e.g., computing devices) in a distributed network to: allocate a respective amount of storage to store a respective plot file defining a set of proofs-of-space; and to generate a block to extend a proof-of-space-based blockchain in exchange for a block reward (e.g., an amount of cryptocurrency). More specifically, the population of nodes compete to earn a right to generate a block (or to "win" a block) to append to the blockchain, wherein a likelihood of a node winning the block is based on a storage capacity allocated to storing the node's plot file, and wherein a larger amount of storage allocated to storing the node's plot file corresponds to a higher likelihood of the node winning a block.

Accordingly, Steps of the method S100 can be executed by nodes to: join a reward pool including a set of nodes (hereinafter "member nodes") to increase a total amount of storage allocated to storing plot files across the set of member nodes; commit future earned block rewards to the reward pool by flexibly allocating these block rewards to a pool address associated with the reward pool; and then periodically receive a portion of a total amount of block rewards accumulated in the reward pool address. Therefore, the set of member nodes can cooperate to: increase an overall likelihood of winning a block; and share accumulated block rewards among member nodes such that each member node can earn block rewards more consistently.

Furthermore, Steps of the method S100 can be executed by a member node—within the population of nodes—to: generate a plot file defining a set of proofs-of-space and a singleton puzzle hash; submit a transaction configured to generate a singleton associated with the singleton puzzle hash and specifying a pool address associated with a reward pool; generate a proof-of-space based on the plot file in response to a challenge from the blockchain; and generate a block based on the proof-of-space, the block including a block reward allocated to the singleton puzzle hash. Therefore, because a plot file defines a singleton puzzle hash rather than a particular pool address: a respective operator node associated with a respective reward pool can retrieve a block reward allocated to the singleton puzzle hash; and a member node can dynamically switch reward pools utilizing an existing plot file stored on the member node, obviating a need to generate a new plot file defining a new pool address associated with another reward pool.

Similarly, Steps of the method S100 can be executed by an operator node to: identify a set of singletons specifying a pool address associated with a reward pool; detect a block reward allocated to a singleton puzzle hash corresponding to a singleton in the set of singletons; and submit a transaction configured to transfer the block reward from the singleton puzzle hash to the pool address. Additionally, the operator node can execute Steps of the method S100 to distribute pooled block rewards among member nodes of the reward pool. Therefore, an operator node can: track a set of singletons (and singleton puzzle hashes) corresponding to member nodes of a reward pool; and claim earned block rewards on behalf of the member nodes while these member nodes participate in the reward pool.

In one example, a member node can execute Steps of the method S100 to switch reward pools by submitting a transaction configured to generate a singleton indicating a transfer state and including: a singleton puzzle hash; a new pool address; and an escape time. During an escape period exhibiting a length of the escape time, the operator node can execute Steps of the method S100 to: detect a block reward allocated to the singleton puzzle hash; and submit a transaction configured to transfer the block reward from the singleton puzzle hash to the pool address associated with the reward pool. Therefore: an operator node can ensure block rewards are claimed on behalf of member nodes while these member nodes are committed to the reward pool; and a member node can dynamically participate in different reward pools while being prevented from, upon winning a block, immediately leaving the reward pool and keeping the block reward.

In another example, an operator node and a set of member nodes of a reward pool can execute Steps of the method S100 to: communicate generated partial proofs-of-space responsive to challenges on the blockchain; accumulate a respective partial proof-of-space score for each member node based on the partial proofs-of-space; and disburse pooled block rewards among member nodes of the reward pool based on the partial proof-of-space scores. Therefore, block rewards can be disbursed among member nodes of the reward pool proportional to each member node's likelihood of winning an actual block to extend the blockchain.

The method S100 as described herein is executed by nodes to pool, retrieve, and disburse block rewards in a distributed network extending a proof-of-space-based blockchain. However, nodes in a distributed network extending other types of blockchains (e.g., proof-of-work-based blockchain, proof-of-stake-based blockchain) can similarly execute Steps of the method S100 to: submit a transaction configured to generate a singleton associated with the singleton puzzle hash and specifying a pool address; generate a block to append to the blockchain, the block including a block reward allocated to the singleton puzzle hash: identify a set of singletons specifying a pool address associated with a reward pool; detect a block reward allocated to a singleton puzzle hash corresponding to a singleton in the set of singletons; and submit a transaction configured to transfer the block reward from the singleton puzzle hash to the pool address.

2.1 Terms and Definitions

Generally, a "reward pool" as referred to herein is a group of nodes, including an operator node and a set of member nodes, committed to pooling and sharing block rewards earned in exchange for generating (or "winning") a new block to append to the blockchain.

Generally, a "member node" as referred to herein is a node configured to: generate a proof-of-space responsive to a challenge; generate a new block to append to the blockchain in exchange for a block reward; and allocate the block reward to the reward pool.

Generally, an "operator node" as referred to herein is a node configured to: retrieve block rewards on behalf of the set of member nodes; and disburse a respective share of block rewards to each member node in the set of member nodes.

Generally, a "plot file" as referred to herein is structure defining a set of proofs-of-space.

Generally, a "singleton puzzle hash" as referred to herein is a contract address with which to assign block rewards.

Generally, a "plot seed" as referred to herein is value utilized as a deterministic seed to generate a plot file.

Generally, a "cryptographic hash" as referred to herein is a mathematical algorithm that maps data to a bit array of a fixed size.

3. Blockchain Structure

Generally, a distributed network includes nodes (e.g., computing devices) interconnected through a communication medium (e.g., the Internet, a wide area network, a local area network). Each node in the distributed network can:

maintain a copy of a decentralized database (or "blockchain"); and participate in forming a trustless consensus regarding a state of the decentralized database.

Generally, a blockchain describes a data structure including a series of blocks. A block can include a set of transactions between addresses representing entities utilizing the blockchain. For example, these transactions can include cryptocurrency transactions and/or smart contracts that enforce specific node behavior. In one implementation, the structure of the blockchain can be analogous (i.e., similar, identical) to the structure described in U.S. Pat. No. 11,165,582.

Nodes executes Steps of the method S100 to create and/or modify smart contracts that exist on the blockchain and that are enforced by the distributed network. As utilized herein, the term "enforce" refers to the idea that non-malicious nodes extend versions of the blockchain that encode valid contracts and transactions. Therefore, although a node may submit invalid transactions or smart contracts for inclusion in the blockchain, a majority of nodes will reject these invalid transactions and/or smart contracts and will instead extend a version of the blockchain that does not include these transactions, thereby preventing these transactions and/or smart contracts from taking effect. Thus, certain Steps of the method S100 rely on enforcement by the distributed network in order to disincentivize malicious behavior.

Generally, nodes in the distributed network can execute Steps of the method S100 to collectively extend the blockchain. More specifically, each node can: allocate an amount of space on a storage device; maintain a transaction buffer (hereinafter "mempool") of pending transactions communicated over the distributed network; generate proofs-of-space in response to challenges received from the distributed network; and, upon generating a valid proof-of-space responsive to a challenge, generate a block including a set of transactions from the transaction buffer. In one implementation, a node can generate a block according to the method described in U.S. patent application Ser. No. 17/320,114. Thus, each node in the distributed network can cryptographically prove allocation of disk space in order to "win" the privilege to add blocks to the blockchain.

3.1 Reward Pooling

Generally, a reward can be allocated to a node for successfully generating and appending a new block to the blockchain. However, a likelihood of an individual node earning a right to add a block to the blockchain, and thus earn a block reward, decreases as the individual node's share of total disk space reserved across the distributed network decreases (e.g., due to an increase in a number of nodes participating in the distributed network).

Accordingly, a set of nodes in the distributed network can execute Steps of the method S100 to collaborate in pooling and disbursing block rewards among each node in the set of nodes. More specifically, each node (or "member node") in the set of nodes (or "the set of member nodes") can allocate earned block rewards (or portions thereof) to the reward pool in exchange for a periodic allocation of a share of block rewards collectively earned by the set of member nodes. A special node (or "operator node") in the reward pool can: retrieve block rewards on behalf of the set of member nodes; and disburse a respective share of block rewards to each member node, as described below.

4. Flexible Plotting

Steps of the method S100 recite, during an initial time period, by a first member node in the set of member nodes: generating a plot file defining a set of proofs-of-space and a singleton puzzle hash in Step S110; and storing the plot file on the storage device in Step S114.

Generally, nodes in the distributed network can compete to earn the right to generate a block to append to the blockchain based on proofs-of-space generated from plot files by these nodes. A node can allocate an amount of disk storage for generating proofs-of-space.

In one implementation, a member node can: generate a plot file characterized by an amount of allocated storage space on a storage device accessible by the member node in Step S110; and store the plot file on the storage device in Step S112. Thus, the member node can algorithmically generate a unique plot file that occupies the allocated storage space on the storage device accessible by the member node. Each plot file defines a structure that cryptographically verifies its presence on a storage device accessible to the member node and prevents malicious nodes from generating proofs-of-space in response to challenges without allocating storage.

In this implementation, the member node can generate the plot file by generating a set of tables (e.g., seven tables) representing proofs-of-space based on a plot seed, the set of tables including many individual proofs-of-space (e.g., 4,294,967,296 proofs-of-space for 100 gigabytes of allocated storage space). For example, the member node can generate a plot file according to a method described in U.S. patent application Ser. No. 17/320,144. Thus, the member node can identify a match between a challenge a proof-of-space represented in the plot file.

5.1. Singleton Puzzle Hash

In one implementation, a member node can generate a plot file based on a plot seed including a singleton puzzle hash, the singleton puzzle hash representing an address to which block rewards are transferred in response to winning a block based on a proof-of-space generated from the plot file. For example, the member node can: access a plot key associated with the first member node; access a singleton puzzle hash; generate a hash value based on the plot key and the singleton puzzle hash (e.g., SHA256 (plot key, singleton puzzle hash)); generate a plot seed including the hash value; and generate the plot file based on the plot seed. In this example, the member node generates a plot file representing a set of proofs-of-space, each proof-of-space in the set of proofs-of-space linked to the singleton puzzle hash. Therefore, if the member node generates a proof-of-space to successfully win a block (e.g., a proof-of-space greater than a threshold quality), then a block reward (or a portion thereof) is allocated to the singleton puzzle hash.

Thus, by associating the plot file with a singleton puzzle hash instead of an address owned by a particular entity (e.g., the member node, a particular reward pool), block rewards can be stored in association with the singleton puzzle hash until claimed by an operator node of a reward pool in which the member node is a participant (i.e., a member node can switch pools utilizing the generated plot file, obviating a need for the member node to generate a new plot file associated with another reward pool).

6. Singleton Creation

Step S114 of the method S100 recites, during an initial time period, by a first member node in the set of member nodes: submitting a first transaction configured to generate a first singleton based on the singleton puzzle hash.

Generally, a member node can submit a transaction to generate a singleton associated with a singleton puzzle hash.

In one implementation, in Step S114, the member node can submit a transaction configured to generate a singleton based on the singleton puzzle hash, the singleton including:

an outer puzzle hash linking the singleton to the singleton puzzle hash; and an inner puzzle hash defining a collection state of the singleton representing an owner address and a pool address. More specifically, the member node can submit the transaction to the distributed network for inclusion in a subsequent block on the blockchain.

In this implementation, the member node can submit the transaction further configured to spend a genesis coin (e.g., valued at a minimum allowable denomination of a cryptocurrency) to initiate the singleton on the blockchain, the genesis coin including a launcher identifier (or "launcher ID") uniquely identifying the member node and the singleton. Additionally, the member node can submit the transaction including a transaction fee.

6.1 Outer Puzzle Hash

Generally, a member node can generate a singleton including an outer puzzle hash uniquely identifying the singleton and linking the singleton to the singleton puzzle hash. More specifically, the member node can generate the singleton including the outer puzzle hash characterized by a hash function (or other function) including the singleton puzzle hash.

In one implementation, the member node can generate a singleton including an outer puzzle hash linking the singleton to the singleton puzzle hash based on a launcher ID of a genesis coin spent to generate the singleton. For example, the member node can generate the singleton including the outer puzzle hash characterized by a hash value based on the singleton puzzle hash and the launcher ID.

6.2 Inner Puzzle Hash

Generally, a member node can generate a singleton including an inner puzzle hash defining a state of the singleton and/or any other metadata associated with the singleton.

In one implementation, a member node can generate a singleton including an inner puzzle hash defining a state of the singleton representing an owner address (e.g., an address associated with the member node) and a pool address (e.g., an address associated with the reward pool).

Nodes (e.g., member nodes of the reward pool, nodes excluded from the reward pool) in the distributed network extending the blockchain can enforce transactions involving the singleton based on the data represented by the inner puzzle. For example, in response to receiving a transaction (e.g., modifying the singleton) associated with an address that is different from the owner address or the pool address, nodes in the distributed network can reject inclusion of the transaction in a subsequent block of the blockchain.

The member node, by generating a singleton including an inner puzzle representing an owner address, ensures that only the member node can successfully submit specific types of transactions associated with the singleton. In one implementation, the member node can submit a transaction to the distributed network that modifies the pool address represented by the inner puzzle of a singleton, thereby modifying the destination of block rewards for blocks created by the member node. Thus, representation of the owner address by the inner puzzle of the singleton can enable a member node—with specific rights—to modify the singleton. In this implementation, any transaction attempting to modify the singleton that is not associated with the owner address (or the pool address, as described below) represented by the inner puzzle of the singleton is excluded from the blockchain record by well-behaved nodes of the distributed network.

The member node, by generating a singleton including an inner puzzle representing a pool address, enables an operator node associated with the pool address to claim block rewards from the associated singleton puzzle hash to which block rewards are allocated. Therefore, in response to receiving a transaction configured to transfer block rewards from the singleton puzzle hash to a pool address via the singleton, nodes of the distributed network can: compare the pool address in the transaction with the pool address represented by the inner puzzle of the singleton; and, in response to detecting a mismatch between the pool address in the transaction and the pool address represented by the inner puzzle of the transaction, exclude the transaction from the blockchain. Thus, the member node can designate a pool address that receives block rewards generated by the member node by representing the pool address associated in the inner puzzle of the singleton on the blockchain.

7. Blockchain Extension

Steps of the method S100 recite, during a first time period succeeding the initial time period, by a first member node in a set of member nodes: accessing a first challenge from a first version of the blockchain in Step S120; generating a first proof-of-space, from the set of proofs-of-space, responsive to the first challenge in Step S122; broadcasting the first proof-of-space over the distributed network in Step S124; generating a first block based on the first proof-of-space, the first block including a block reward allocated to the singleton puzzle hash in Step S126; and broadcasting the first block over the distributed network in Step S128.

Generally, a node (e.g., a member node in the reward pool, a node excluded from the reward pool) in the distributed network can generate a block to append to the blockchain based on a proof-of-space generated from a plot file responsive to a challenge, such as according to a method described in U.S. patent application Ser. No. 17/320,144 or U.S. patent application Ser. No. 17/497,699.

7.1 Challenge Acquisition

Step S120 of the method S100 recites accessing a first challenge from a first version of the blockchain.

Generally, upon allocating storage space in a storage device accessible to the member node (e.g., via generation of plot files occupying this storage space), the member node can: access a current version of the blockchain; and access challenges based on the current version of the blockchain.

In one implementation, in Step S120, the member node can access (or receive) a challenge based on a prior block in a first version of the blockchain, the prior block including a prior proof-of-space and a prior proof-of-time. Thus, the member node can access or receive the challenge and look-up the challenge within a plot file stored on a storage device accessible to the member node.

7.2 Proof-of-Space Generation

Steps of the method S100 recite: generating a first proof-of-space, from the set of proofs-of-space, responsive to the first challenge in Step S122; and broadcasting the first proof-of-space over the distributed network in Step S124.

Generally, in response to accessing the challenge, the member node can generate a proof-of-space based on the challenge and the amount of allocated storage space in Step S122, the proof-of-space indicating (or proving) allocation of the amount of storage space. Additionally, in response to generating the proof-of-space, the member node can broadcast the proof-of-space over the distributed network in Step S124.

In one implementation, the pool server can: generate the proof-of-space based on the challenge and the amount of storage space in Block S122, the proof-of-space indicating allocation of the amount of storage space; generate a quality characterizing the proof-of-space based on a quality function representing the proof-of-space and the challenge; and calculate a time delay based on the quality. Thus, when generating a proof-of-space responsive to a challenge, the member node can calculate a quality of the proof-of-space to ascertain an amount of time (as measured by a proof-of-time generated by a time server) sufficient to add a block, including the proof-of-space, to the blockchain. For example, if the member node calculates a relatively high quality of the proof-of-space, then the time delay to generate a block including the proof-of-space is relatively short. However, if the member node calculates a relatively low quality of the proof-of-space, the time delay to generate a block including the proof-of-space is relatively long. Therefore, a node in the distributed network that generates the highest quality proof-of-space in response to a given challenge is able to generate a block to add to the blockchain first.

In another implementation, the member node can calculate a quality of a proof-of-space by executing a cryptographic hash of the challenge concatenated with a component of the proof-of-space. For example, the member node can calculate a quality of the proof-of-space by looking up one branch of a binary tree associated with the proof-of-space and hashing this branch with the challenge to generate a quality value for the proof-of-space. In this implementation, the member node can calculate a quality of the proof-of-space while only accessing a single branch of the proof-of-space and, in response to identifying that the quality of the proof-of-space exceeds a threshold quality, retrieve the remaining initial values constituting the proof-of-space.

7.3 Block Creation

Steps of the method S100 recite: generating a first block based on the first proof-of-space, the first block including a block reward allocated to the singleton puzzle hash in Block S126; and broadcasting the first block over the distributed network in Step S128.

Generally, in order to generate a new data block, the member node can maintain a transaction buffer of pending transactions communicated from the distributed network and aggregated since generation of the previous block.

In one implementation, in Step S126, a member node can generate a block based on the generated proof-of-space, the block including: a set of transactions from a transaction buffer; and a block reward allocated to the singleton puzzle hash. More specifically, the member node can: create a data payload for the new block based on the transaction buffer (e.g., a set of transactions in the transaction buffer); calculate a cryptographic hash of a prior data block in the data chain; and sign the data block based on the private key associated with the proof-of-space.

In one implementation, the member node can broadcast the new block over a distributed network in Step S128. More specifically, the member node can broadcast the new block to other nodes in the distributed network for verification by these nodes and inclusion within each node's local copy of the blockchain.

7.5 Next Block

Generally, a member node can iteratively repeat Steps S120, S122, S124, S126, and S128 of the method S100 for a next block to be created and added to the blockchain. For example, the member node can: access a second challenge from a second version of the blockchain in Step S120; generate a second proof-of-space, from the set of proofs-of-space, responsive to the second challenge in Step S122; broadcast the second proof-of-space over the distributed network in Step S124; generate a second block based on the second proof-of-space, the second block including a second block reward allocated to the singleton puzzle hash in Step S126; and broadcast the second block over the distributed network in Step S128.

8. Reward Absorption

Generally, an operator node can collect (or "absorb") block rewards generated by member nodes of the reward pool by: detecting a block reward allocated to a singleton puzzle hash; and submitting a transaction configured to spend the singleton (or remove the singleton from a set of extant singletons), and transfer the block reward from the first singleton puzzle hash to the pool address associated with the reward pool. More specifically, the operator node can: track a set of singletons on the blockchain that indicate a pool address associated with the reward pool; and track block rewards at the set of singleton puzzle hashes associated with the set of singletons. Thus, upon detecting that block rewards are deposited at a singleton puzzle hash in the set of singleton puzzle hashes, the operator node can submit a transaction configured to retrieve the block reward from the singleton puzzle hash.

8.1 Singleton Tracking

Steps of the method S100 recite, during an initial time period, by the operator node: identifying a first set of singletons in the first version of the blockchain in Step S130.

Generally, the operator node can access a current version of the blockchain and identify a set of singletons, each singleton in the set of singletons including an inner puzzle indicating a pool address associated with a reward pool.

In one implementation, the operator node can: access a current version of the blockchain; and identify a set of singletons in the current version of the blockchain in Step S130, each singleton in the set of singletons including an outer puzzle hash linking a respective singleton in the set of singletons to a respective singleton puzzle hash in a set of singleton puzzle hashes, and an inner puzzle hash defining a collection state of a respective singleton representing a respective owner address associated with a respective member node in the set of member nodes and a pool address associated with the reward pool.

For example, the operator node can identify a first singleton in the set of singletons in the first version of the blockchain. In this example, the first singleton can include: an outer puzzle hash linking the first singleton to a first singleton puzzle hash; and an inner puzzle hash defining a collection state of the first singleton representing a first owner address of the first singleton (e.g., an address associated with a first member node in the set of member nodes) and a pool address associated with the reward pool.

Therefore, by identifying the set of singletons including an inner puzzle hash including the pool address associated with the reward pool, the operator node can also identify a set of singleton puzzle hashes corresponding to the set of singletons. Accordingly, the operator node can track the set of singleton puzzle hashes to detect when a block reward has been allocated to a singleton puzzle hash in the set of singleton puzzle hashes.

8.2 Reward Transfer

Steps of the method S100 recite, during a first time period succeeding the initial time period, by the operator node: detecting a block reward allocated to a first singleton puzzle hash in the set of singleton puzzle hashes in Step S132; identifying a first singleton in the first set of singletons linked to the first singleton puzzle hash in Step S134; and submitting a first transaction transferring the block reward from the first singleton puzzle hash to the first pool address in Step S136.

In one implementation, in Step S132, the operator node can detect that a block reward is allocated to a first singleton puzzle hash in a set of singleton puzzle hashes tracked by the operator node. For example, the operator node can detect that a block reward is allocated to the first singleton puzzle hash based on a reward height (e.g., 1,750,000,000,000) associated with the first singleton puzzle hash. In response to detecting a block reward allocated to the first singleton puzzle hash, the operator node can identify a singleton (e.g., the first singleton) linked to the first singleton puzzle hash in Step S134.

Generally, the operator node submits a transaction to retrieve a block reward from a singleton puzzle hash by spending the corresponding singleton and transferring the block rewards present in association with the singleton puzzle hash from the singleton puzzle hash to the pool address associated with the pool server. More specifically, the operator node can submit a transaction configured to: remove the singleton from a set of extant singletons (or "spend" the singleton); and generate a new singleton based on the removed (or "spent") singleton.

In one implementation, in Step S136, the operator node can submit a transaction configured to transfer the block reward from the first singleton puzzle hash to the pool address. In particular, in Step S136, the operator node can submit a transaction configured to: remove the first singleton from the set of singletons; and generate a second singleton, based on the first singleton, in the set of singletons. In this implementation, the operator node can submit the transaction further configured to generate the second singleton including an outer puzzle hash linking the second singleton to the first singleton puzzle hash. For example, the operator node can generate the second singleton including an outer puzzle hash characterized by a hash value based on the singleton puzzle hash and the launcher ID (i.e., a launcher ID associated with the genesis coin spent to generate the first singleton). Furthermore, the operator node can generate the second singleton including an inner puzzle hash defining a collection state of the second singleton representing the owner address (e.g., an identical owner address as represented in the inner puzzle of the first singleton) and the pool address (e.g., an identical pool address as represented in the inner puzzle of the first singleton).

Thus, in this implementation, the relationship between iterations of a singleton and the singleton puzzle hash is recorded over a number of blocks within the blockchain and can be traced back to the genesis coin via the launcher ID included in the multiple iterations of singletons recorded on the blockchain.

In one variation, the member node associated with the first singleton, another member node participating in the reward pool, and/or any other node in the distributed network can submit a transaction configured to: remove the first singleton from the set of singletons; transfer the block reward from the first singleton puzzle hash to the pool address; and generate the second singleton. In this variation, any node in the distributed network extending the blockchain can submit the aforementioned transaction configured to transfer block rewards from the singleton puzzle hash to the pool address specified by the singleton associated with the singleton puzzle hash.

Alternatively, in another variation, the member node can submit a transaction configured to transfer the block reward to another address (i.e., different from the pool address) if the block reward remains allocated to a singleton hash puzzle for an amount of time exceeding a threshold amount of time. More specifically, in response to detecting a block reward allocated to a first singleton puzzle hash for an amount of time exceeding a threshold amount of time (e.g., 30 blocks, 60 blocks), the member node can: submit a transaction to the distributed network: remove the first singleton from the set of singletons; transfer the block reward from the first singleton puzzle hash to another address (e.g., a wallet address associated with the member node, a second pool address); and generate the second singleton. Accordingly, a member node can still claim a block reward when an operator node fails to timely claim the block reward on behalf of the member node (and the reward pool).

In another implementation, the operator node can retrieve block rewards from the singleton puzzle hash when a corresponding singleton is in a collection state and indicates the pool address associated with the reward pool. Additionally, the operator node can retrieve block rewards from the singleton puzzle hash when a corresponding singleton is in a transfer state and indicates the pool address associated with the reward pool. The collection state of the singleton and the transfer state of the singleton are further described below.

8.2.1 Collection State

Generally, when a singleton associated with a singleton puzzle hash is in a collection state, an operator node associated with a pool address represented by an inner puzzle hash of the singleton can freely issue transactions to transfer block rewards from the singleton puzzle hash to the pool address. The singleton exists in the collection state, and is regenerated in the collection state, until the member node attempts to change a pool address of the singleton as described below.

8.2.2 Transfer State

Generally, the member node can cause the singleton to enter a transfer state by submitting a transaction configured to: spend the singleton; and replace the singleton with a new singleton defining an inner puzzle representing the transfer state. More specifically, the member node submits a transaction, to the distributed network, configured to: remove the singleton from a set of extant singletons; and generate a new singleton defining an inner puzzle defining a transfer state representing a new pool address associated with a different reward pool. Thus, the member node notifies the operator node (and the rest of the distributed network) that the member node is switching from an initial pool address to a new pool address. Once the singleton has entered the transfer state, the current operator node associated with the initial pool address can continue to collect block rewards from the associated singleton puzzle hash until expiration of an escape time indicated by the inner puzzle of the singleton.

9. Pool Switching

Figure 3:
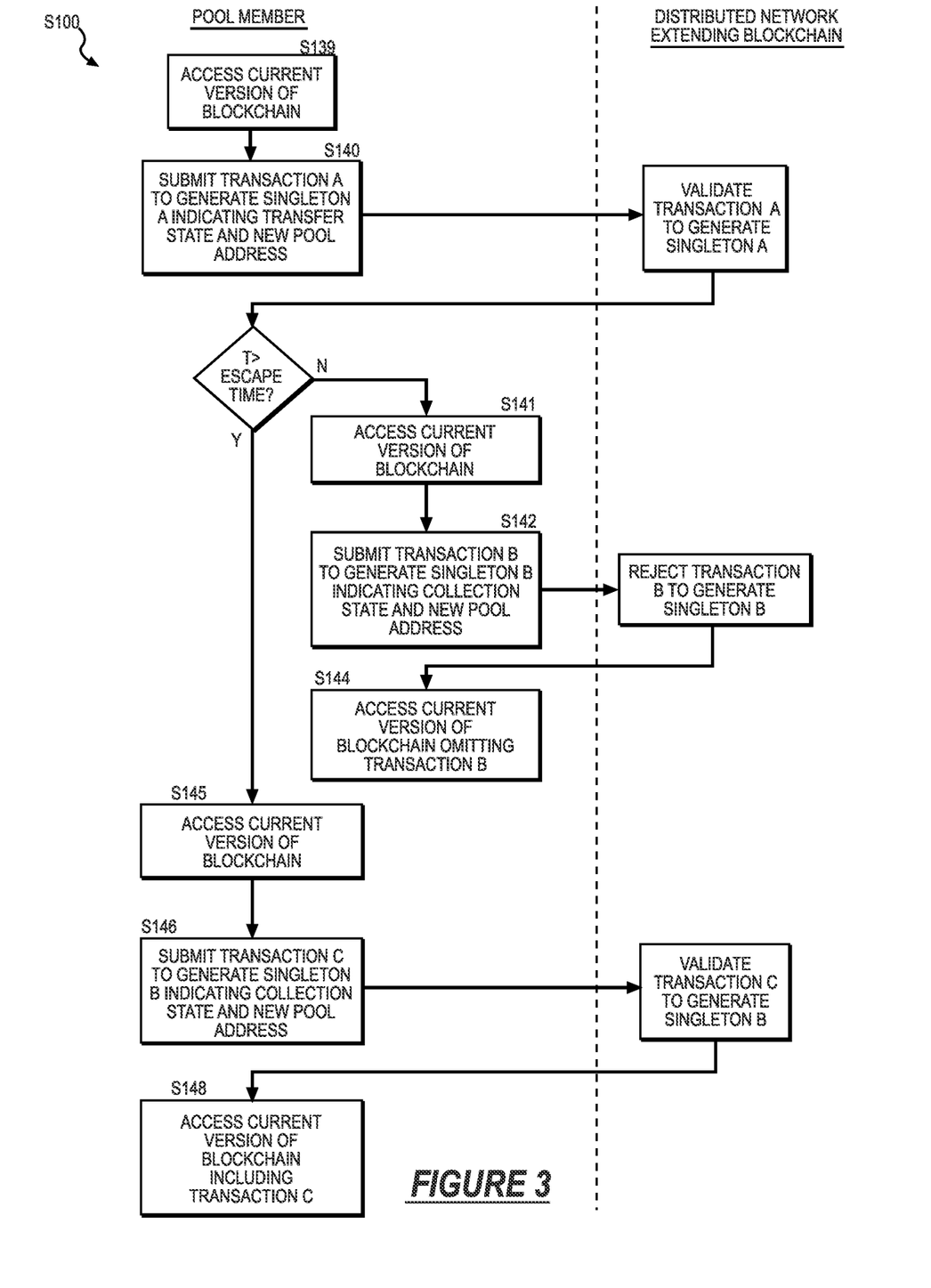
FIG. 3 is a flowchart representation of one variation of the method.

As shown in FIG. 3, Steps of the method S100 recite, during a second time period succeeding the initial time period, by the first member node: accessing a second version of the blockchain including a set of singletons, the set of singletons including the first singleton in Step S139; and, in Step S140, submitting a second transaction configured to generate a second singleton in the set of singletons based on the first singleton, the second singleton including: an outer puzzle hash linking the second singleton to the singleton puzzle hash; and an inner puzzle hash defining a transfer state of the second singleton representing the owner address, the first pool address, a second pool address associated with a different reward pool, and an escape time.

Generally, a member node can switch pools with which to participate in reward pooling. More specifically, a member node can modify the singleton (i.e., generate a new singleton indicating a transfer state) corresponding to the member node to indicate a new pool address, thereby directing block rewards to the new pool server.

In one implementation, the member node can: access a second (i.e., current) version of the blockchain defining a set of singletons including the first singleton in Step S139; and submit a transaction configured to generate a second singleton in the set of singletons based on the first singleton in Step S140, the second singleton including an inner puzzle hash defining a transfer state of the second singleton representing the owner address, the first pool address; a second pool address, and an escape time. More specifically, in Step S140, the member node can submit a transaction to the distributed network, the transaction configured to: remove the first singleton from the set of singletons; and generate a second singleton in the set of singletons, the second singleton including an outer puzzle hash linking the second singleton to the first singleton puzzle hash. For example, the operator node can generate the second singleton including an outer puzzle hash characterized by a hash value based on the singleton puzzle hash and the launcher ID.

Furthermore, the member node can generate the second singleton including an inner puzzle hash defining a transfer state of the second singleton representing the owner address (e.g., an identical owner address as represented in the inner puzzle of the first singleton); the first pool address; a second pool address (e.g., a second pool address different from the first pool address as represented in the inner puzzle of the first singleton); and an escape time. Accordingly, the operator node associated with the first pool address can still retrieve a block reward allocated to the first singleton puzzle hash until expiration of the escape time.

The member node, by generating a singleton including an inner puzzle representing an escape time, ensures that the distributed network can enforce a delay time between the member node submitting a transaction configured to modify the pool address of the singleton (thereby redirecting block rewards generated by the member node) and the previous pool server being prevented from claiming block rewards. This delay prevents the member node from leaving the reward pool upon creating a block and earning block rewards in order to keep the block rewards to themselves. Generally, the member node can generate a singleton including an inner puzzle representing an escape time expressed in a number of blocks. For example, the member node can generate a singleton defining an inner puzzle representing an escape time of 30 blocks. Thus, in this example, the member node can submit a transaction modifying the pool address of the singleton from a first pool address to a second pool address. However, this transaction cannot take effect until after 30 blocks have been added to the blockchain, as is further described below.

9.1 Pending Escape Period

Steps of the method S100 recite, during a third time period spanning the second time period and an escape period, the escape period succeeding the second time period and exhibiting a length of the escape time, by the first member node: accessing a third version of the blockchain defining the set of singletons, the set of singletons including the second singleton in Step S141; and submitting a third transaction configured to generate a third singleton in the set of singletons based on the second singleton in Step S142, the third singleton including a) an outer puzzle hash linking the third singleton to the singleton puzzle hash and b) an inner puzzle hash defining a collection state of the third singleton representing the owner address and the second pool address.

Step S144 of the method S100 recites, during a fourth time period succeeding the third time period: accessing a fourth version of the blockchain, the fourth version of the blockchain omitting the third transaction.

Generally, the member node can submit a third transaction to the distributed network to generate a third singleton indicating a new pool address of a different reward pool and indicating a collection state. If the member node attempts to submit this transaction prior to expiration of the escape time indicated by the singleton (e.g., the second singleton including the escape time), the distributed network will not accept the transaction as a valid transaction in a new block. Thus, the distributed network enforces the escape time indicated by the singleton and prevents the member node from switching pools before the escape time expires.

In one implementation, the member node can: access a third (i.e., current) version of the blockchain defining the set of singletons including the second singleton in Step S141; and, in Step S142, submit a transaction configured to remove the second singleton in the transfer state from the set of singletons, and generate a third singleton, indicating the second pool address, before expiration of the escape time. In particular, the member node can, during a third time period spanning the second time period and an escape period, the escape period succeeding the second time period and exhibiting a length of the escape time, submit a transaction to the distributed network, the transaction configured to: remove the second singleton from the set of singletons; and generate a third singleton in the set of singletons based on the second singleton, the third singleton including an outer puzzle hash linking the second singleton to the singleton puzzle hash, and an inner puzzle hash defining a collection state of the third singleton representing the owner address and the second pool address.

However, because the member node submits this transaction before expiration of the escape time, nodes of the distributed network will reject this invalid transaction and instead extend a version of the blockchain that does not include this transaction. Accordingly, during a fourth time period succeeding the third time period (i.e., after the member node submitted the invalid transaction) the member node can access a fourth version of the blockchain in Step S144, the fourth version of the blockchain omitting this invalid transaction.

9.2 Escape Period Block Absorption

Step S130 of the method S100 recites, during a second time period succeeding the initial time period, by the operator node: identifying the set of singletons in a second version of the blockchain, the set of singletons including a second singleton including an outer puzzle hash linking the second singleton to a second singleton puzzle hash in the set of singleton puzzle hashes, and an inner puzzle hash defining a transfer state of the second singleton representing the first pool address, a second pool address associated with a different reward pool, and an escape time.

Steps of the method S100 recite, during a third time period spanning the second time period and an escape period, the escape period succeeding the second time period and exhibiting a length of the escape time, by the operator node: detecting a block reward allocated to the second singleton puzzle hash in the set of singleton puzzle hashes in Step S132; identifying the second singleton linked to the second singleton puzzle hash in Step S134; and submitting a second transaction configured to remove the second singleton from the set of singletons, and transfer the block reward from the second singleton puzzle hash to the first pool address in Step S136.

Generally, the operator node can continue collecting block rewards generated by a member node during an escape period responsive to the member node switching pools. The operator node can collect block rewards in an analogous (e.g., similar, identical) manner as described above.

For example, the operator node can: access the second version of the blockchain; and identify the set of singletons in the second version of the blockchain, the set of singletons including the second singleton including an outer puzzle hash linking the second singleton to a singleton puzzle hash, and an inner puzzle hash defining a transfer state of the second singleton representing the first pool address (i.e., associated with the reward pool) a second pool address associated with another reward pool, and an escape time. During a third time period spanning the second time period and an escape period, the escape period succeeding the second time period and exhibiting a length of the escape time, the operator node can: detect a block reward allocated to the singleton puzzle hash; identify the second singleton linked to the singleton puzzle hash; and submit a transaction to the distributed network, the transaction configured to remove the second singleton from the set of singletons, and transfer the block reward from the singleton puzzle hash to the first pool address.

Additionally, the operator node can submit this transaction further configured to: generate a third singleton in the set of singletons based on the second singleton, the third singleton including: an outer puzzle hash linking the third singleton to the singleton puzzle hash; and an inner puzzle hash defining a transfer state of the third singleton representing the first pool address, the second pool address, and the escape time. Accordingly, when a member node wins a block during an escape period to switch reward pools, the operator node's transaction to transfer block reward also removes the corresponding singleton and generates a new singleton including the escape time (i.e., the escape period is reset). Thus, the operator node can continue collecting block rewards on behalf of this member node until expiration of the new escape time.

9.3 Completed Escape Period

Steps of the method S100 recite, during a fourth time period succeeding a third time period spanning the second time period and an escape period, the escape period succeeding the second time period and exhibiting a length of the escape time, by the first member node: accessing a third version of the blockchain defining the set of singletons in Step S145, the set of singletons including the second singleton; and submitting a third transaction configured to generate a third singleton in the set of singletons based on the second singleton in Step S146, the third singleton including a) an outer puzzle hash linking the third singleton to the singleton puzzle hash and b) an inner puzzle hash defining a collection state of the third singleton representing the owner address and the second pool address.

Step S148 of the method S100 recites, during a fifth time period succeeding the fourth time period, accessing a fourth version of the blockchain, the fourth version of the blockchain including the third transaction.

In one implementation, the member node can: access a third (i.e., current) version of the blockchain defining the set of singletons including the second singleton in Step S141; and, in Step S142, submit a transaction configured to remove the second singleton in the transfer state from the set of singletons, and generate a third singleton, indicating the second pool address, after expiration of the escape time. In particular, the member node can, during a fourth time period succeeding a third time period spanning the second time period and an escape period, the escape period succeeding the second time period and exhibiting a length of the escape time, submit a transaction to the distributed network, the transaction configured to: remove the second singleton from the set of singletons; and generate a third singleton in the set of singletons based on the second singleton, the third singleton including an outer puzzle hash linking the second singleton to the singleton puzzle hash, and an inner puzzle hash defining a collection state of the third singleton representing the owner address and the second pool address.

Because the member node submits this transaction after expiration of the escape time, nodes of the distributed network will accept this transaction and will extend a version of the blockchain that includes this transaction. Accordingly, during a fifth time period succeeding the fourth time period (i.e., after the member node submitted the valid transaction) the member node can access a fourth version of the blockchain in Step S148, the fourth version of the blockchain including the invalid transaction.

In one variation, the member node can, when generating a singleton indicating a transfer state, generate a singleton defining an inner puzzle indicating a new pool address, such that a new pool server associated with the new pool address is notified that the member node intends to join the new pool server. In this implementation, the distributed network can automatically convert the singleton in the transfer state to a new singleton in the collection state in response to expiration of the escape time indicated by the singleton.

10. Pooling Protocol

Generally, an operator node can execute a pooling protocol in order to distribute accumulated block rewards (e.g., based on the amount of drive storage each member node has allocated to extending the proof-of-space-based blockchain) among member nodes of the reward pool. More specifically, the operator node can: evaluate the amount of drive storage allocated by each member node by assigning a lower difficulty level than the difficultly level for the blockchain consensus protocol for the member node; and receive partial proofs-of-space from the member node responsive to challenges derived from the blockchain. The operator node can then award points based on a quantity of partial proofs-of-space received from each member node and the difficulty level assigned to the member node during a disbursement period. Thus, the operator node can distribute pooled block rewards to member nodes of the reward pool based on each member node's real ability to extend the blockchain, thereby maintaining trustless disbursement of pooled block rewards to a set of member nodes.

10.1 Partial Proofs-Of-Space

Generally, the operator node communicates with each member node in a set of member nodes via an HTTP or another network communication protocol to set or adjust a respective difficulty for partial proofs-of-space for the respective member node.

Generally, in order to generate a partial proof-of-space, a member node can: receive a challenge based on a current version of the blockchain; retrieve a proof-of-space from a plot file based on the difficulty level assigned to the member node by the operator node; and transfer the proof-of-space directly to the operator node.

10.1.1 Difficulty

Step S150 of the method S100 recites selecting the difficulty for a partial proof-of-space for the first member node.

Generally, the operator node can select (or assign) a difficulty for a partial proof-of-space for each member node in the set of member nodes. More specifically, the operator node can select a first difficulty as an initial difficulty for a partial proof-of-space for a member node. Additionally, the operator node can also select a new difficulty as an adjustment to the initial difficulty (or subsequently selected difficulties).

Generally, a member node generates a partial proof-of-space in an amount of time proportional to a difficulty of the partial proof-of-space. Therefore, the member node is awarded a number of points proportional to a difficulty of a generated partial proof-of-space.

In one implementation, in Step S150, the operator node can select a difficulty for partial proofs-of-space for a member node based on a target rate of partial proof-of-space generation. For example, the operator node can select a difficulty (e.g., 50, 100) for a member node to achieve a target rate of 300 partial proofs-of-space generated per day. The operator node can select the target average rate of partial proofs-of-space based on the performance of the operator node (e.g., the maximum total rate of partial proofs-of-space that the pool server can process divided by the total number of members of the pool).

In another implementation, the operator node can select a low initial difficulty (e.g., 5, 10, 50) for partial proofs-of-space for a member node and subsequently adjust the difficulty based on a number of partial proofs-of-space received during an initial sampling period. More specifically, the operator node can select the low initial difficulty, and subsequently adjust the difficulty based on a target rate of partial proof-of-space generation (e.g., 300 proofs-of-space per day) and a number of partial proofs-of-space received during an initial sampling period.

In yet another implementation, the operator node can select an initial difficulty (e.g., 100, 200) for a partial proof-of-space for the member node based on a reported amount of storage (e.g., 1 tehibyte) allocated by the member node. Additionally, the operator node can select a difficulty a partial proof-of-space for the member node based on a reported amount of storage allocated by the member node and a target rate (e.g., 300 partial proofs-of-space per day) of partial proof-of-space generation. More specifically, the operator node can select a difficulty. for a partial-proof-of-space for the member node corresponding to the target rate of partial proof-of-space generation based on an amount of storage space allocated to a plot file by the member node.

Furthermore, the operator node can individually select a difficulty for partial proofs-of-space for each member node. Therefore, the operator node can select a different difficulty for partial proofs-of-space for each member node. For example, the operator node can set the difficulty for each member node in the set of member nodes to achieve a target rate of partial proofs-of-space. In this example, the operator node can set a different difficulty for each member node to ensure that each member node transmits partial proofs-of-space to the operator node at approximately the target rate.

In one variation, a member node can select a difficulty for a partial proof-of-space for the member node. For example, the member node can communicate with the operator node via an HTTP (or another network communication protocol) to select or adjust the difficulty for a partial proof-of-space for the member node.

10.1.2 Partial Proof-of-Space Submission

Steps of the method S100 recite, during a second time period succeeding the initial time period, by the first member node: accessing a second challenge from a second version of the blockchain in Step S152; generating a first partial proof-of-space, corresponding to a first difficulty, from the plot file in Step S154; and transmitting the first partial proof-of-space to the operator node in Step S156.

In one implementation, the member node can: access (or receive) a challenge from a current version of the blockchain in Step S152; generate a partial proof-of-space from the plot file in Step S154, the partial proof-of-space corresponding to a difficulty selected for the member node; and transmit the partial proof-of-space to the operator node in Step S156. The member node (and each member node of the set of member nodes) can iteratively execute Steps S152, S154, and S156 of the method S100 over a disbursement period.

In one variation, the member node or the operator node can select a different difficulty level for partial proofs-of-space for the member node. More specifically, the member node or the operator node can select a different difficulty level for partial proofs-of-space for the member node within a disbursement period and/or in a subsequent disbursement period.

In one example, the member node can: access a first challenge from a first version of the blockchain; generate a first partial proof-of-space from the plot file, the first partial proof-of-space corresponding to a first difficulty; and transmit the first partial proof-of-space to the operator node. The member node can then: access a second challenge from a second version of the blockchain; generate a second partial proof-of-space from the plot file, the second partial proof-of-space corresponding to a second difficulty exceeding the first difficulty; and transmit the second partial proof-of-space to the operator node.

In another example, the member node can: access a first challenge from a first version of the blockchain; generate a first partial proof-of-space from the plot file, the first partial proof-of-space corresponding to a first difficulty; and transmit the first partial proof-of-space to the operator node. The member node can then: access a second challenge from a second version of the blockchain; generate a second partial proof-of-space from the plot file, the second partial proof-of-space corresponding to a second difficulty falling below the first difficulty; and transmit the second partial proof-of-space to the operator node.

10.1.3 Partial Proof-of-Space Reception and Scoring

Steps of the method S100 recite, during a second time period succeeding the initial time period, by the operator node: identifying the set of member nodes based on the set of singletons in Step S160; receiving a first set of partial proofs-of-space from a first member node in the set of member nodes in Step S162; and calculating a first partial proof-of-space score for the first member node in Step S166.

In one implementation, in Step S160, the operator node can identify a set of member nodes in the reward pool based on a set of singletons, each singleton in the set of singletons including an inner hash puzzle defining a pool address associated with the reward pool. The operator node can then receive partial proofs-of-space from each member node in the set of member nodes in Step S162. For example, the operator node can receive a first set of partial proofs-of-space from a first member node in the set of member nodes.

Generally, the operator node can calculate a respective partial proof-of-space score for each member node in the set of member nodes. More specifically, the operator node can calculate the respective partial proof-of-space score for each member node in the set of member nodes over a disbursement period. The operator node can set any disbursement period, which can be specified based on a number of elapsed blocks or in any other unit of time or measure of blockchain length. The operator node can tabulate a point score for each member node based on a quantity of partial proofs-of-space received during the disbursement period and difficulty of the partial proofs-of-space.

In one implementation, in Step S166, the operator node can calculate a partial proof-of-space score based on a quantity of partial proofs-of-space, in the set of partial proofs-of-space, multiplied by a difficulty assigned to a member node.

For example, the operator node can calculate a first partial proof-of-space score (e.g., for a first member node) based on a quantity of partial proofs-of-space (e.g., 300), in a first set of partial proofs-of-space received from the first member node during the disbursement period, multiplied by a difficulty (e.g., 10) assigned to the first member node during the disbursement period. In this example, the operator node can calculate the first partial proof-of-space score as 3,000 (i.e., 300 multiplied by 10).

In another implementation, the operator node can: for each partial proof-of-space in the set of partial proofs-of-space, calculate a respective point value based on a difficulty of a respective proof-of-space (e.g., a point value of 10 based on a proof-of-space characterized by a difficulty of 10, a point value of 100 based on a proof-of-space characterized by a difficulty of 100) in Step S164; and calculate a proof-of-space score based on a sum of the respective point values during the disbursement period in Step S166. In this implementation, the operator node can calculate respective point values and the proof-of-space score as corresponding partial proofs-of-space are received during the disbursement period.

Additionally, the operator node can validate a received partial proof-of-space. The operator node can calculate a point value in response to validating the partial proof-of-space.

10.2 Reward Disbursement

Step S168 of the method S100 recites, during a second time period succeeding the initial time period, by the operator node: disbursing a first amount of block reward in the first pool address to the first member node based on the first partial proof-of-space score.

Generally, upon completion of the disbursement period, the operator node can allocate the accumulated block rewards retrieved by the operator node during the disbursement period to each member node in the set of member nodes proportional to the partial proof-of-space score of each member node. The operator node can identify current member nodes participating in the reward pool based on the status of singletons on the blockchain and can disburse pooled block rewards based on current member nodes of the reward pool.

In one implementation, in Step S168, the operator node can disburse a respective amount of block reward to each member node in the set of member nodes based on a respective partial proof-of-space score of a respective member node. More specifically, the operator node can, for each member node in the set of member nodes: calculate a respective share based on a proportion of a respective partial proof-of-space score to a total proof-of-space score for the set of member nodes (i.e., a sum of partial proof-of-space scores for the set of members of the pool) during the disbursement period in Step S110; and calculate a respective amount of block reward based on the respective share in Step S172. In this implementation, the operator node can calculate the respective amount of block reward equal to a total amount of block rewards accumulated in the pool address (or a portion thereof) during the disbursement period multiplied by the respective share. Therefore, the operator node can fairly disburse block rewards to member nodes proportional to each member node's likelihood of winning an actual block to extend the blockchain.

For example, the operator node can: calculate a first share corresponding to a first member node based on a proportion of a first partial proof-of-space score (e.g., 3,000), corresponding to the first member node, to a total proof-of-space score (e.g., 100,000) for the set of member nodes in the reward pool during the disbursement period; and calculate a first amount of block reward for the first member node based on the first share. More specifically, the operator node can calculate the first amount of block reward equal to a portion (e.g., 95 percent) of a total amount of block rewards (1,750,000,000,000) accumulated in the pool address during the disbursement period multiplied by the respective share. In this example, the operator node can: calculate the first share as 0.03 (i.e., 3,000 divided by 100,000); and calculate the first amount of block reward as 49,875,000 (i.e., 0.95 multiplied by 1,750,000,000,000 multiplied by 0.03). The operator node can disburse the first amount of block reward to the first member node, such as at a wallet address associated with the first member node.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for pooling block rewards in a reward pool comprising an operator node and a set of member nodes in a distributed network extending a proof-of-space-based blockchain, the method comprising:
during an initial time period, by a first member node in the set of member nodes:
generating a plot file defining:
a set of proofs-of-space; and
a singleton puzzle hash;
storing the plot file on a storage device; and
submitting a first transaction configured to generate a first singleton based on the singleton puzzle hash, the first singleton comprising:
an outer puzzle hash linking the first singleton to the singleton puzzle hash; and an inner puzzle hash defining a collection state of the
first singleton representing:
an owner address associated with the first member
node; and
a first pool address associated with the reward
pool; and
during a first time period succeeding the initial time
period, by the first member node:
accessing a first challenge from a first version of the
blockchain;
generating a first proof-of-space, from the set of proofs-
of-space, responsive to the first challenge;
broadcasting the first proof-of-space over the distrib-
uted network;
generating a first block based on the first proof-of-
space, the first block comprising a block reward
allocated to the singleton puzzle hash; and
broadcasting the first block over the distributed net-
work;
during a second time period succeeding the initial time
period, by the first member node:
accessing a second challenge from a second version of
the blockchain;
generating a first partial proof-of-space, corresponding
to a first difficulty, from the plot file; and
transmitting the first partial proof-of-space to the opera-
tor node; and
during a third time period succeeding the second time
period, by the first member node:
accessing a third challenge from a third version of the
blockchain;
generating a second partial proof-of-space, correspond-
ing to a second difficulty exceeding the first diffi-
culty, from the plot file; and
transmitting the second partial proof-of-space to the
operator node.

2. The method of claim 1, further comprising, during a
second time period succeeding the initial time period, by the
first member node:
accessing a second version of the blockchain comprising
a set of singletons, the set of singletons comprising the
first singleton; and
submitting a second transaction configured to generate a
second singleton in the set of singletons based on the
first singleton, the second singleton comprising:
an outer puzzle hash linking the second singleton to the
singleton puzzle hash; and
an inner puzzle hash defining a transfer state of the
second singleton representing:
the owner address;
the first pool address;
a second pool address associated with a different
reward pool; and
an escape time.

3. The method of claim 2, further comprising:
during a third time period spanning the second time
period and an escape period, the escape period suc-
ceeding the second time period and exhibiting a length
of the escape time, by the first member node:
accessing a third version of the blockchain comprising
the set of singletons, the set of singletons comprising
the second singleton; and
submitting a third transaction configured to generate a
third singleton in the set of singletons based on the
second singleton, the third singleton comprising:
an outer puzzle hash linking the third singleton to the
singleton puzzle hash; and
an inner puzzle hash defining a collection state of the
third singleton representing:
the owner address; and
the second pool address; and
during a fourth time period succeeding the third time
period, accessing a fourth version of the blockchain, the
fourth version of the blockchain omitting the third
transaction.

4. The method of claim 2, further comprising:
during a fourth time period succeeding a third time period
spanning the second time period and an escape period,
the escape period succeeding the second time period
and exhibiting a length of the escape time, by the first
member node:
accessing a third version of the blockchain comprising
the set of singletons, the set of singletons comprising
the second singleton; and
submitting a third transaction configured to generate a
third singleton in the set of singletons based on the
second singleton, the third singleton comprising:
an outer puzzle hash linking the third singleton to the
singleton puzzle hash; and
an inner puzzle hash defining a collection state of the
third singleton representing:
the owner address; and
the second pool address; and
during a fifth time period succeeding the fourth time
period, accessing a fourth version of the blockchain, the
fourth version of the blockchain comprising the third
transaction.

5. The method of claim 2:
further comprising, during a third time period succeeding
the second time period, accessing a third version of the
blockchain comprising the set of singletons, the set of
singletons omitting the first singleton; and
wherein submitting the second transaction configured to
generate the second singleton comprises submitting the
second transaction further configured to remove the
first singleton from the set of singletons.

6. The method of claim 1, wherein generating the plot file
comprises:
accessing a plot key associated with the first member
node;
accessing the singleton puzzle hash;
generating a hash value based on the plot key and the
singleton puzzle hash;
generating a plot seed comprising the hash value; and
generating the plot file based on the plot seed.

7. The method of claim 1, wherein submitting the first
transaction configured to generate the first singleton based
on the singleton puzzle hash comprises submitting the first
transaction configured to:
spend a genesis coin comprising a launcher ID; and
generate the first singleton comprising an outer puzzle
hash characterized by a hash value based on the single-
ton puzzle hash and the launcher ID.

8. The method of claim 1, further comprising, during a
second time period succeeding the first time period, by the
first member node, in response to detecting the block reward
allocated to the singleton puzzle hash for an amount of time
exceeding a threshold amount of time, submitting a second
transaction configured to transfer the block reward from the
singleton puzzle hash to a wallet address.

9. A system for pooling block rewards in a reward pool in
a distributed network extending a proof-of-space-based
blockchain, the system comprising:

an operator node comprising a processor coupled to a memory; and a set of member nodes comprising a first member node comprising a first processor coupled to a first memory;

during an initial time period, by the first processor of a first member node:
   generating a plot file defining:
      a set of proofs-of-space; and
      a singleton puzzle hash;
   storing the plot file on a storage device; and
   submitting a first transaction configured to generate a first singleton based on the singleton puzzle hash, the first singleton comprising:
      an outer puzzle hash linking the first singleton to the singleton puzzle hash; and
      an inner puzzle hash defining a collection state of the first singleton representing:
         an owner address associated with the first member node; and
         a first pool address associated with the reward pool; and during a first time period succeeding the initial time period, by the first processor of the first member node:
   accessing a first challenge from a first version of the blockchain;
   generating a first proof-of-space, from the set of proofs-of-space, responsive to the first challenge;
   broadcasting the first proof-of-space over the distributed network;
   generating a first block based on the first proof-of-space, the first block comprising a block reward allocated to the singleton puzzle hash; and
   broadcasting the first block over the distributed network;

during a second time period succeeding the initial time period, by the first processor of the first member node:
   accessing a second challenge from a second version of the blockchain;
   generating a first partial proof-of-space, corresponding to a first difficulty, from the plot file; and
   transmitting the first partial proof-of-space to the operator node; and during a third time period succeeding the second time period, by the first processor of the first member node:
   accessing a third challenge from a third version of the blockchain;
   generating a second partial proof-of-space, corresponding to a second difficulty exceeding the first difficulty, from the plot file; and
   transmitting the second partial proof-of-space to the operator node.

10. A non-transitory computer readable medium storing program instructions that, when executed by a processor of a first member node in a set of member nodes, cause the processor of the first member node to execute a method for pooling block rewards in a reward pool in a distributed network extending a proof-of-space-based blockchain, the method comprising:
   during an initial time period, by the processor of the first member node:
      generating a plot file defining:
         a set of proofs-of-space; and
         a singleton puzzle hash;
      storing the plot file on a storage device; and
      submitting a first transaction configured to generate a first singleton based on the singleton puzzle hash, the first singleton comprising:
         an outer puzzle hash linking the first singleton to the singleton puzzle hash; and
         an inner puzzle hash defining a collection state of the first singleton representing:
            an owner address associated with the first member node; and
            a first pool address associated with the reward pool; and
   during a first time period succeeding the initial time period, by the processor of the first member node:
      accessing a first challenge from a first version of the blockchain;
      generating a first proof-of-space, from the set of proofs-of-space, responsive to the first challenge;
      broadcasting the first proof-of-space over the distributed network;
      generating a first block based on the first proof-of-space, the first block comprising a block reward allocated to the singleton puzzle hash; and
      broadcasting the first block over the distributed network;
   during a second time period succeeding the initial time period, by the processor of the first member node:
      accessing a second challenge from a second version of the blockchain;
      generating a first partial proof-of-space, corresponding to a first difficulty, from the plot file; and
      transmitting the first partial proof-of-space to the operator node; and
   during a third time period succeeding the second time period, by the processor of the first member node:
      accessing a third challenge from a third version of the blockchain;
      generating a second partial proof-of-space, corresponding to a second difficulty exceeding the first difficulty, from the plot file; and
      transmitting the second partial proof-of-space to the operator node.

* * * * *